Figures 2, 3:
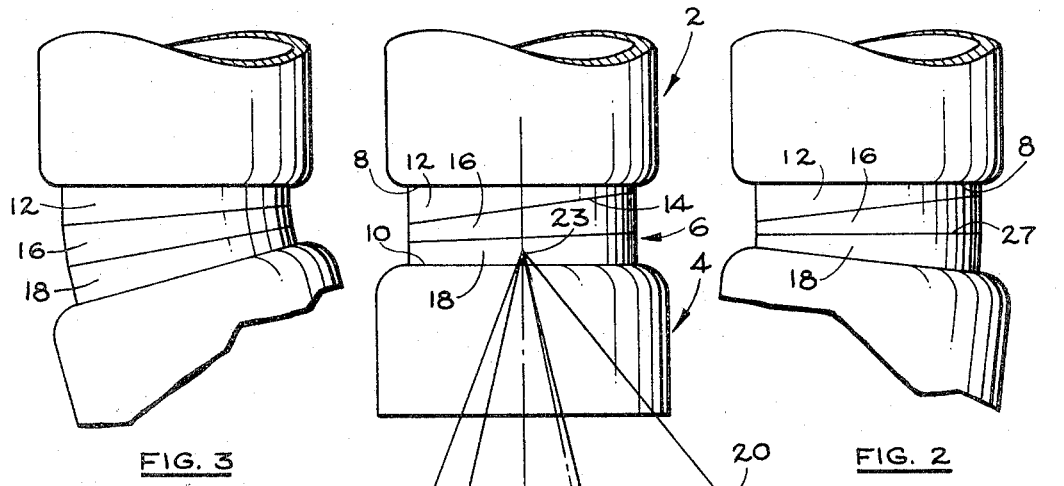

Jan. 31, 1967   M. I. HOFFMAN ETAL   3,300,977
GIMBAL DEVICE WITH ROTARY CAM RING SECTIONS
Filed Aug. 24, 1964

INVENTORS
THOMAS E. COWELL
BY MARK I. HOFFMAN

Donald W. Graves
ATTORNEY

United States Patent Office 3,300,977
Patented Jan. 31, 1967

3,300,977
GIMBAL DEVICE WITH ROTARY CAM
RING SECTIONS
Mark I. Hoffman, Solano Beach, and Thomas E. Cowell, Woodland Hills, Calif., assignors to North American Aviation, Inc.
Filed Aug. 24, 1964, Ser. No. 391,394
10 Claims. (Cl. 60—228)

The invention described herein was made in the performance of work under a NASA contract and is subject to the provisions of the National Aeronautics and Space Act of 1958, Public Law 85–568 (72 Stat. 426; 42 U.S.C. 2451), as amended.

This invention relates to a gimbal device.

More particularly, this invention relates to a gimbal device which has particular application for gimballing one element relative to another.

This invention provides a gimbal system which has applicability whenever it is desired to change the angular relationship between two or more components. For example, the device has utility in pipe lines where it is necessary to change the alignment between adjacent sections. Other applications include alignment of antennas, optical equipment and movable entrance ramps for aircraft where the angular relationship between the ramp and aircraft varies. There are, of course, many other examples that can be given. It is suffice to say that this invention has utility in any area where it is desired to change the alignment between two or more elements and/or transmit force between them. While the invention is described with reference to a gimbal system between a rocket engine and missile, it is understood that the invention is not limited thereto.

When a missile is fired into space by means of a rocket engine, it is necessary that some means be provided to control the direction of thrust. Several methods have been employed in the past and include the firing of small engines to alter the course of the missile. Another method involves providing a gimbal between the rocket engine (or engines) and the missile. This gimbal usually comprises a universal ball joint between the engine and the missile. Gimballing of the engine is controlled by mechanical actuators such as a piston and cylinder with the piston connected to the missile and the cylinder to the engine or vice versa. Several of these actuators are provided so that the engine may gimbal through a cone of revolution. Still another method of gimballing engines is to hinge the engines to the missile and by providing a plurality of engines and moving selected engines, the missile can be vectored. Other methods of thrust vector control include side gas injection in the engine itself so as to provide a sidewardly directed force in the desired direction.

With the advent of new technology in the rocket engine field, it has been found that many of the old gimbal devices are inadequate. For example, engines now being developed tend to be shorter and wider than the conventional bell or de Laval nozzle type engine. With a wider engine, the problems of transmitting thrust as well as obtaining enough force to move the engine relative to the missile is serious. It is to solve many of the problems in the art to which this invention is directed.

Briefly, this invention, as described, relates to a gimbal device which is attached to a missile and an engine and provides a means by which thrust is transmitted between the engines and the missile while allowing a gimballing action to occur when desired. The gimbal device includes two annular wedge-shaped rings (or cam rings) one of which is attached to the missile and rotatable relative thereto, and the other attached to and rotatable relative to the engine. The two wedge-shaped rings or members are attached to and rotatable to each other. By rotating one or more of the wedge-shaped rings, the direction of thrust transmitted by the engine to the missile can be changed. By providing non-parallel faces of the engine and missile attachment points to the rings, an improved gimballing action results. An object of this invention is to provide an improved gimbal system.

Figure 1:
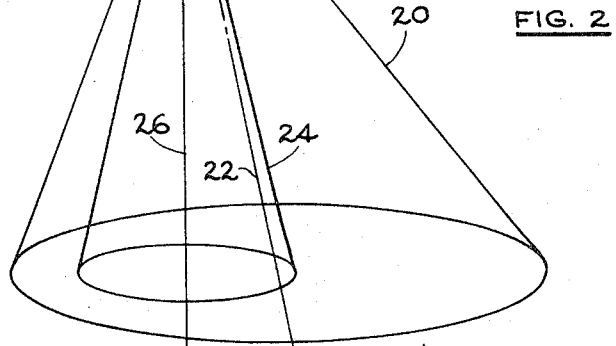
Figures 4, 5:
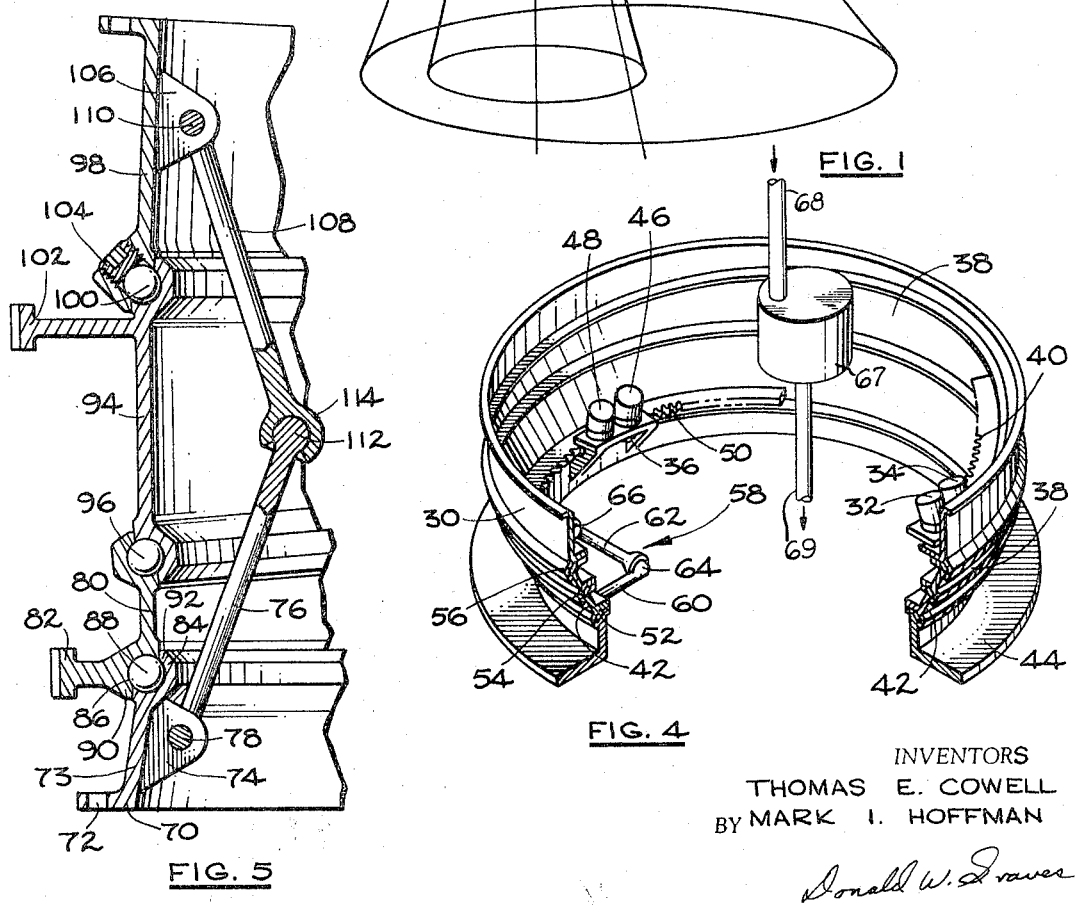

Other objects and advantages of this invention will become apparent as this description proceeds taken in conjunction with the drawings in which:

FIG. 1 is a schematic view of a rocket engine and missile with the improved gimbal system of this invention, FIG. 2 is a schematic view of the engine and missile system with the engine at a gimbal angle to the left, FIG. 3 is a schematic view of the engine and missile system with the engine at a gimbal angle to the right, FIG. 4 is a perspective view partially cutaway of the gimbal system according to one embodiment of this invention, and FIG. 5 is a cross-section of a portion of the gimbal system according to another embodiment of this invention.

FIG. 1 shows generally a missile 2, an engine 4 and a gimbal system 6 in its simplest form. The rear face 8 of the missile 2 is parallel to the forward portion 10 of the engine when the thrust vector is directed along the longitudinal axis 26 of the missile. However, a portion 12 is rigidly attached to the missile with a planar surface 14 which is not parallel to face 10 when the thrust vector is directed along the longitudinal axis. Rotatable, wedge-shaped rings 16 and wedge 18 are rotatable relative to each other and to the engine 4 and portion 12 of missile 2.

Since the surfaces 14 and 10 are non-parallel, upon rotation of wedges 16 and 18 in selected directions, the engine axis may be gimballed and passed through any point within cone 20 which has its central axis at 22. The axis 22 is shown as diverging from gimbal point 23 at an angle to the longitudinal axis 26 of missile 2. Cone 24 represents the desired cone of revolution and lies within cone 20. Thus, the wedges are arranged such that movement occurs within cone 24 which is well within the maximum allowed represented by cone 20. There are two advantages in providing for the non-parallel faces 14 and 10 of the missile and engine. The primary advantage is that when the wedges are actuated, there is less of a problem in "hunting." For example, when a gimbal angle is desired which is only slightly off the center line of the main axis of rotation 22, small degrees of rotation of the plates causes a relatively large shift away from the main axis of rotation. When the gimbal plates are actuated such that the gimbal angle is toward the outside of cone 20, relatively small gimbal changes can be made with relatively large rotation of the wedges.

This is an advantage for control purposes. Thus, by constructing the device such that the surfaces 14 and 10 are non-parallel, all movement of the wedges in order to obtain the necessary gimbal angle occurs near the outside of cone 20 and more particularly represented by the cone of revolution 24. Another important advantage in making the surfaces non-parallel is that more direct action is possible at all times in moving from one gimbal angle to another. If the wedges were mounted to parallel surfaces of the missile and engine and the wedges aligned such that the thinnest portion of one wedge were at the same point as the thickest portion of the other wedge, a signal to gimbal in a direction at right angles to the diameter driven through that point results in a situation in which the wedges may be moved in either direction. When the surfaces are non-parallel, the control signal results in a situation in which the wedges can only move in one direction in order to obtain the desired gimbal angle in the shortest possible span of time.

As an illustration of how the non-parallel faces of the surfaces can be utilized, the following example is given. Assuming portion 12 is a 10° wedge surface and that wedges 16 and 18 are likewise 10° wedges, if the widest portion of the wedges are aligned as shown in FIG. 3, the angles are accumulated such that the engine is gimballed relative to the missile at an angle of 30°. In the maximum gimbal to the other side, as illustrated in FIG. 2, the surface 14 and wedge 16 being both at an angle of 10°, balance each other such that wedge surface 27 is parallel to the missile plane surface 8. Wedge 18, being at an angle of 10° thus makes the gimbal angle 10° maximum when gimballed to the left as shown in FIG. 2. Since the maximum gimbal angle desired may be 10° or less, it can be seen that with the arrangement shown, the device can be gimballed 10° in any direction even though as viewed in FIG. 3, a maximum gimbal angle of 30° can be obtained in one direction. This arrangement of angular surfaces thus dictates the direction and size of cone 20 and axis 22. These angles are, of course, illustrative only and they can be varied at will depending on the gimballing action required.

Referring now to FIG. 4, a perspective view of one embodiment of this invention is shown. A missile-attached portion 30 of the missile gimbal (corresponding to 12 in FIG. 1) has mounted on it reversible motors 32 and 34 which may vary in number depending on the power requirements. These motors, by means of gears not shown, drive wedges 38 by means of teeth 40 mounted on the inner periphery of wedge 38. In practice, these teeth extend approximately 60° around the wedge. Another wedge 42 is rotatable relative to wedge 38 and to portion 44 which is rigidly attached to the engine structure. Portion 44 has mounted thereon reversible motors 46 and 48 which by means of gears 36 intermesh with gear teeth 50 which are mounted on wedge 42. In this embodiment, tapered bearings 52, 54 and 56 are pictured and function to permit ease of rotation. To prevent relative rotation between engine portion 44 and missile structure 30, a brace assembly 58 comprising a brace 60 and brace 62 connected by a universal joint 64 is used. Brace 62 is pivoted to missile structure 30 by means of pin 66. Brace 60 is likewise pivoted to engine portion 44. Thus, the angular relationship between any part of missile portion 30 and any part of engine portion 44 can be varied with relative rotation between the two elements precluded.

Shown schematically in FIGURE 4 is a propellant flow regulator 67, a propellant inlet conduit 68 which may be attached to missile-attached portion 30, and a propellant outlet conduit 69 which may be attached to engine portion 44. The conduit 69 would preferably be connected to the usual injector component of the combustion chamber with which engine portion 44 is associated. The precise means for positioning propellant regulator 67 is not important in the instant invention and those skilled in the art will recognize that there are numerous ways to achieve this.

In FIG. 5 a cross-sectional view of another embodiment of this invention is shown. At 70, is an annular flange portion for side wall 73 which is fastened to the engine by any convenient means such as a nut and bolt arrangement through apertures 72. Side wall 73 has mounted thereon a plurality of gussets 74 to which braces 76 are attached by means of pins 78. Rotatable cam ring or wedge 80 has mounted thereon teeth 82 which may be driven by an external motor not shown. Engine side wall 73 and wedge 80 have flanges 84 and 86, respectively. Flange 86 and flange 84 cooperatively define a bearing race for containing bearings 88 to allow rotation of the two elements relative to each other. By this arrangement, the bearings are adapted to transmit thrust in a compressive direction between cam or wedge 80 and sidewall 73. Likewise, the bearings are adapted to prevent axial displacement of the two sections relative to each other since portion 90 of flange 86 and portion 92 of flange 84 prevent sections 73 and 80 from separating when a tensile load is supplied. Cam or wedge 94 is rotatable relative to cam 80 and in a similar manner has bearings 96 for transmission of tensile and compressive forces between cam or wedge 94 and cam or wedge 80. The missile structure 98 is attached to cam wedge 94 through ball bearings 100. Gear teeth 102 extending from cam 94 are driven by an external motor not shown. A plug 104 is screwed into the missile section structure 98, which, when removed, provides an aperture into the bearing race so that bearings 100 can be inserted or removed at will. One or more gussets 106 are attached to missile portion 98 and braces 108 fastened to gussets 106 by means of pins 110. A ball and socket joint is formed between braces 108 and 76 by ball 112 and retaining flange 114. By this means, rotation between missile portion 98 and engine structure 70 is prevented. At the same time, the angular relationship or gimballing of engine portion 73 with respect to the missile portion 98 is allowed due to the pivoting action facilitated by pins 110, 78 and ball and socket joint formed by ball 112 and flange 114.

By utilizing the described structure for a gimbal between the missile and engine, several advantages manifest themselves. For example, all of the thrust load is taken directly through the gimbal system thus not requiring a separate thrust transmitting structure. Another advantage resides in the ability of the system to allow piping, plumbing, electrical controls and other necessary structure to be located entirely within the gimbal system. One advantage in this resides in the relatively little axial displacement required in flexible propellant lines due to their location near the center line of the missile. In prior art examples, the pipe lines had to be located outside of the gimbal system necessitating a complicated flexible and elongatible system. Another advantage of the instant structure resides in a relatively large moment being applied to the engine structure by the gimbal due to the fact that the thrust transmitting portion is located at some distance from the center line of the engine. This is of particular advantage with relatively new type engines which are annular in configuration. Another advantage resides with the application of a rotary force for axial displacement rather than in the more common push-pull arrangement which requires large forces and concentrated points of attachment.

By means of the non-parallel faces in the neutral position between the rigid portion of the engine attaching structure and the missile attaching structure, the problem of hunting at low gimbal angles is substantially reduced. In addition, the gimballing is direct rather than indirect when parallel faces are employed.

While there has been shown and described and pointed out the fundamental and novel features of this invention, it will be understood that there are omissions and substitutions and changes in the form and detail of the device illustrated and its operation may be made by those skilled in the art without departing from the spirit of the invention. It is the intention therefore to be limited only by the scope of the following claims.

We claim:
1. A gimbal device for transmitting thrust between an engine and a missile comprising;
   a first annular wedge-shaped member adapted to rotate relative to said engine and to be attached thereto,
   a second annular wedge-shaped member adapted to rotate relative to and to be attached to both said missile and said first member;
   whereby when either of said members is rotated, the engine will gimbal relative to said missile.
2. A gimbal device according to claim 2 in which means are provided between said missile and said engine to prevent relative rotation thereof.

3. A gimbal device according to claim 1 wherein a first plane surface is formed at the attachment of said first member and said engine and a second plane surface is formed at the attachment of said second member and said missile.

4. A gimbal device according to claim 3 wherein an acute angle is formed between said first and second plane surfaces when the axis of said missile and engine are parallel.

5. A gimbal device according to claim 1 wherein means are provided to supply propellant to said engine, said members completely surrounding at least a portion of said propellant supply means.

6. A gimbal device according to claim 1 wherein motor means are provided to rotate said first member relative to said engine.

7. A gimbal device according to claim 1 wherein motor means are provided to rotate said second member relative to said missile.

8. A gimbal assembly for varying angular orientation between a first and second element comprising:
 a first element,
 a first planar-ended wedge shaped ring fixed to said first element,
 a second element,
 a second planar-ended wedge shaped ring rotatably connected to said second element,
 a third planar-ended wedge shaped ring positioned between and rotatably connected to said first and second rings, and
 means for aligning said members in coaxial relation when the planar end of said first ring fixed to said first element and the planar end of said second ring connected to said second element are parallel.

9. The gimbal assembly set forth in claim 8 wherein rotation of the widest arcuate sections of said second and third rings into alignment with the widest arcuate section of said first ring causes maximum gimballing angulation between the axes of said members.

10. The gimbal assembly set forth in claim 8 further comprising means for restraining relative rotation between said elements.

References Cited by the Examiner

UNITED STATES PATENTS

| | | | |
|---|---|---|---|
| 991,501 | 5/1911 | Graves | 285—181 X |
| 1,798,121 | 3/1931 | Jackes et al. | 285—184 X |
| 2,269,431 | 1/1942 | Allen et al. | 285—181 X |
| 2,696,264 | 12/1954 | Colmerauer et al. | 285—276 X |
| 2,823,703 | 2/1958 | Nusser | 285—181 |
| 3,067,579 | 12/1962 | Olbrich | 60—35.55 |
| 3,073,630 | 1/1963 | Kuhn | 244—52 |
| 3,186,742 | 6/1965 | Frankel et al. | 285—114 |
| 3,188,806 | 6/1965 | O'Hara | 60—35.55 X |

CARLTON R. CROYLE, *Primary Examiner.*